United States Patent
Arap et al.

(10) Patent No.: US 12,439,118 B1
(45) Date of Patent: Oct. 7, 2025

(54) VIRTUAL ASSET INSERTION

(71) Applicant: Amazon Technologies, Inc., Seattle, WA (US)

(72) Inventors: Maxim Arap, San Jose, CA (US); Chun-Hao Liu, Fremont, CA (US); Sheng Liu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 18/334,040

(22) Filed: Jun. 13, 2023

(51) Int. Cl.
| | |
|---|---|
| H04N 21/44 | (2011.01) |
| H04N 21/2187 | (2011.01) |
| H04N 21/234 | (2011.01) |
| H04N 21/431 | (2011.01) |
| H04N 21/81 | (2011.01) |

(52) U.S. Cl.
CPC ... *H04N 21/44008* (2013.01); *H04N 21/2187* (2013.01); *H04N 21/23418* (2013.01); *H04N 21/4312* (2013.01); *H04N 21/8146* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 7,249,367 B2 * | 7/2007 | Bove, Jr. | ............ | H04N 21/4725 375/E7.008 |
| 7,779,438 B2 * | 8/2010 | Davies | ................ | H04N 21/472 725/35 |
| 7,979,877 B2 * | 7/2011 | Huber | ................ | G06Q 30/0275 725/35 |
| 8,666,818 B2 * | 3/2014 | DeVree | .................. | G06Q 30/02 705/14.69 |
| 8,849,945 B1 * | 9/2014 | Desjardins | ............. | G11B 27/34 725/35 |
| 8,885,217 B2 * | 11/2014 | Ohmiya | ............. | G03G 15/0189 358/1.9 |
| 9,621,953 B1 * | 4/2017 | Holcomb | ........... | H04N 21/8456 |
| 10,088,983 B1 * | 10/2018 | Qaddoura | ........ | H04N 21/23439 |
| 10,423,241 B1 * | 9/2019 | Pham | ................... | G02B 27/017 |
| 11,017,611 B1 * | 5/2021 | Mount | .................. | G06V 20/20 |
| 11,856,261 B1 * | 12/2023 | Stankovska | ...... | H04N 21/44008 |
| 12,228,790 B2 * | 2/2025 | Fukuda | ..................... | G06T 5/50 |
| 2002/0059588 A1 * | 5/2002 | Huber | ................... | H04N 7/163 348/E5.103 |

(Continued)

OTHER PUBLICATIONS

Lin et al.; "Real-Time High-Resolution Background Matting"; IEEE/CVF Conf. on Computer Vision and Pattern Recognition; 2021; p. 8762-8771.

(Continued)

*Primary Examiner* — An Son P Huynh
(74) *Attorney, Agent, or Firm* — BakerHostetler

(57) ABSTRACT

At least part of a visual pattern may be detected, in an image of a video, at a location within the image. An occlusion determination may be performed corresponding to the at least part of the visual pattern. At least part of a virtual asset may be inserted, based at least in part on the occlusion determination, into the image at the location. An appearance of the at least part of the virtual asset within the image may be adjusted based at least in part on an appearance of the at least part of the visual pattern within the image.

19 Claims, 9 Drawing Sheets

(56) References Cited

U.S. PATENT DOCUMENTS

| | | | | |
|---|---|---|---|---|
| 2002/0065678 | A1* | 5/2002 | Peliotis | H04N 7/163 |
| | | | | 348/E5.103 |
| 2002/0120931 | A1* | 8/2002 | Huber | H04N 7/17318 |
| | | | | 348/E7.071 |
| 2002/0147987 | A1* | 10/2002 | Reynolds | H04N 7/165 |
| | | | | 348/E7.071 |
| 2003/0028873 | A1* | 2/2003 | Lemmons | H04N 21/23418 |
| | | | | 348/588 |
| 2003/0149983 | A1* | 8/2003 | Markel | H04N 7/16 |
| | | | | 348/E7.054 |
| 2007/0226761 | A1* | 9/2007 | Zalewski | H04N 21/478 |
| | | | | 725/35 |
| 2008/0080009 | A1* | 4/2008 | Masui | H04N 1/32309 |
| | | | | 358/3.28 |
| 2010/0321389 | A1* | 12/2010 | Gay | G06T 15/00 |
| | | | | 345/427 |
| 2011/0249074 | A1* | 10/2011 | Cranfill | G06F 9/451 |
| | | | | 348/E7.083 |
| 2012/0038739 | A1* | 2/2012 | Welch | H04N 13/388 |
| | | | | 345/426 |
| 2012/0050492 | A1* | 3/2012 | Moriwake | H04N 23/83 |
| | | | | 348/47 |
| 2012/0057045 | A1* | 3/2012 | Shimizu | H04N 25/10 |
| | | | | 348/E9.051 |
| 2013/0031582 | A1* | 1/2013 | Tinsman | H04N 21/4316 |
| | | | | 725/36 |
| 2014/0068692 | A1* | 3/2014 | Archibong | H04N 21/6334 |
| | | | | 725/116 |
| 2016/0299563 | A1* | 10/2016 | Stafford | G02B 27/017 |
| 2017/0141847 | A1* | 5/2017 | De Bruijn | H04B 10/116 |
| 2017/0366867 | A1* | 12/2017 | Davies | H04N 21/8146 |
| 2018/0084302 | A1* | 3/2018 | Chen | G06Q 10/101 |
| 2018/0310066 | A1* | 10/2018 | Kobayashi | G11B 27/322 |
| 2019/0179405 | A1* | 6/2019 | Sun | G06F 1/1686 |
| 2020/0029069 | A1* | 1/2020 | Goergen | A63F 13/73 |
| 2021/0388671 | A1* | 12/2021 | Kirkeby | A47G 5/00 |
| 2022/0239988 | A1* | 7/2022 | Yang | H04N 21/4725 |
| 2022/0261951 | A1* | 8/2022 | Renschler | G06T 11/00 |
| 2023/0013539 | A1* | 1/2023 | Holland | G06F 3/1423 |
| 2023/0138677 | A1* | 5/2023 | Kwong | G06T 13/80 |
| | | | | 345/473 |
| 2023/0409749 | A1* | 12/2023 | Li | H04N 21/4318 |
| 2024/0371185 | A1* | 11/2024 | Sadek | G06V 10/761 |
| 2024/0398229 | A1* | 12/2024 | Mehndiratta | G06T 7/73 |

OTHER PUBLICATIONS

Ke et al.; "MODNet: Real-Time Trimap-Free Portrait Matting via Objective Decomposition"; 36$^{th}$ AAAI Conf. on Artificial Intelligence; 2022; p. 1140-1147.

Lin et al.; "Robust High-Resolution Video Matting With Temporal Guidance"; IEEE/CVF Winter Conf. on Applications of Computer Vision; 2022; p. 238-247.

Mur-Artal et al.; "ORB-SLAM: A Versatile and Accurate Monocular SLAM System"; IEEE Transactions on Robotics; vol. 31; 2015; p. 1147-1163.

Hang et al.; "SCS-Co: Self-Consistent Style Contrastive Learning for Image Harmonization"; IEEE/CVF Conf. on Computer Vision and Pattern Recognition; 2022; p. 19710-19719.

Z. Zhang: "A Flexible New Technique for Camera Calibration"; Technical Report MSR-TR-98-71; Microsoft Corporation; Mar. 1999; 22 pages.

T. Williams; "What is Amazon VPP?"; https://www.envisionhorizons.com/what-is-amazon-vpp/; Envision Horizons; May 2022; accessed Jan. 29, 2025; 15 pages.

* cited by examiner

VIRTUAL ASSET INSERTION

BACKGROUND

Video streaming services may transmit video content to large quantities of viewers. In some examples, the video streaming service may receive video from a streamer. A streamer, as that term is used herein, refers to an individual that produces streaming video content. The streamer may send the video to the video streaming service, which, in turn, may transmit the video to the streamer's viewers. In one specific example, a streamer may be a video game player that captures game video of himself of herself playing a video game in combination with webcam video of the streamer that includes the streamer's commentary on the game being played. In some examples, streaming video may be transmitted in real-time, such as to reduce latency between the time that video is captured and played to viewers. Additionally, in some examples, it may be desirable to provide secondary content, such as advertising, in association with the primary video content.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
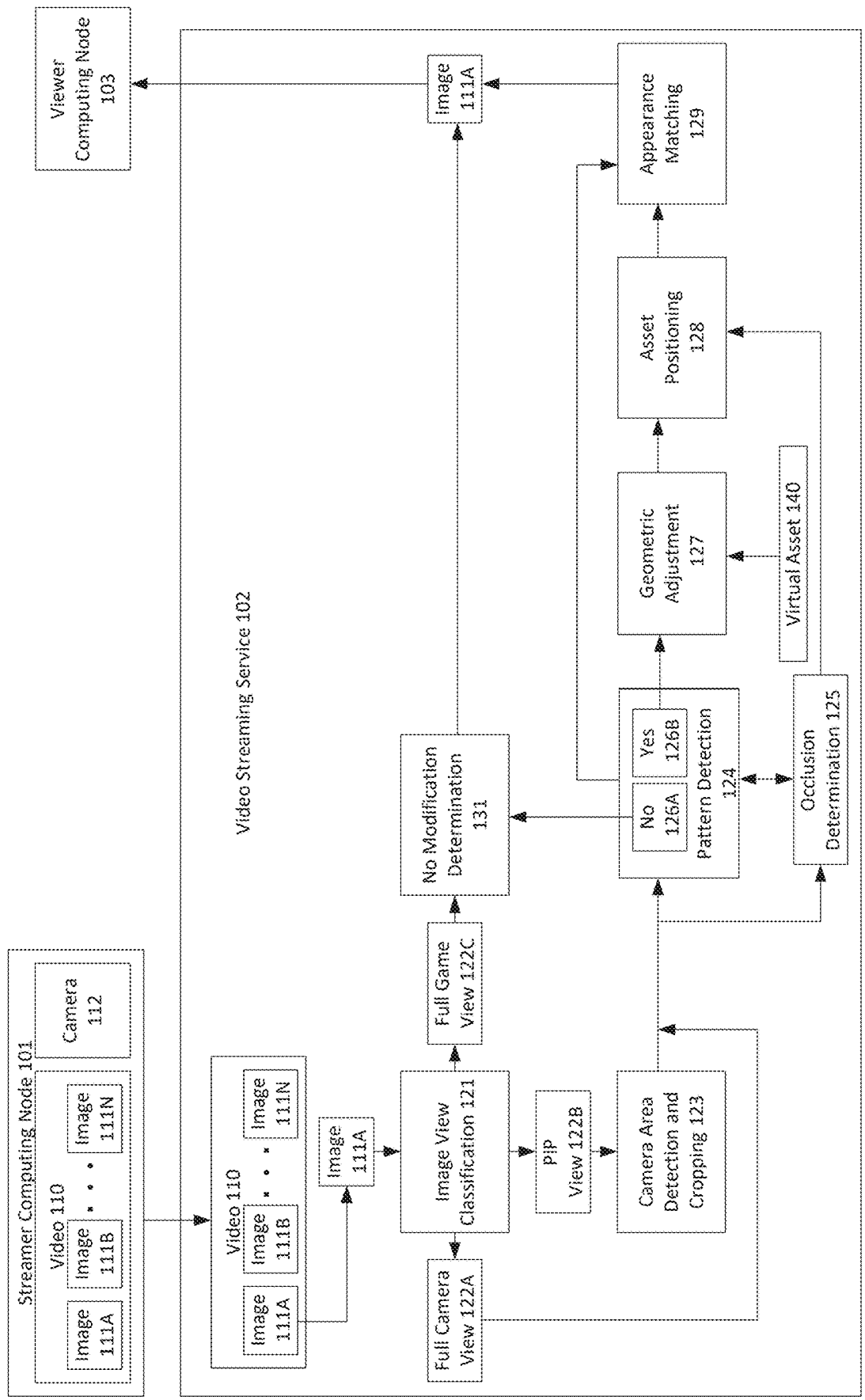
FIG. 1 is a diagram illustrating an example two-dimensional virtual asset insertion system that may be used in accordance with the present description.

Techniques for virtual asset insertion are described herein. As described herein, in combination with capturing of video, a visual pattern may be physically inserted into a scene for which images/video are captured by a camera. In some examples, the visual pattern may be displayed on a physical object, such as a poster, that may be physically inserted into the scene by a user. In one specific example, the visual pattern may be printed on a poster that may be attached to a background area (e.g., a wall of a room) of the captured scene. For example, the poster that displays the visual pattern may be temporarily attached to the wall, such as via an adhesive or other physical attachment technique. The visual pattern may be physically inserted into the scene either before, or during, capturing of the video. As described in detail below, the visual pattern may indicate an area of an image into which a virtual asset may be inserted. The visual pattern may serve as a visual queue to insert a virtual asset at the location at which the visual pattern is detected. Thus, the user may place the visual pattern into an area of the scene that does not include content that is likely to be of high interest to viewers of the video, such as a background area.

The visual pattern may be a visual pattern that is easily detectable within images of the video. Additionally, the visual pattern may be a pattern whose boundaries (e.g., corners, edges) may be reliably detected with high accuracy within images of the video. In some examples, the visual pattern may be a checkerboard pattern. Also, in some examples, the visual pattern may include at least two colors, such as black and white (e.g., a checkerboard with black and white squares). Furthermore, in some examples, the visual pattern may include more than two colors (e.g., a checkerboard with black, white, yellow, pink, blue, green and/or other colored squares). As an alternative to a checkerboard, other visual patterns may be used, such as matrix tags, April tags, and others. In some examples, the use of at least black and white in the visual pattern may be advantageous because black and white may provide a high color contrast, which may be beneficial for color adjustment and other operations described below. Moreover, as described below, the use of additional colors (e.g., yellow, pink, blue, green) may also be beneficial, such as for enhanced color adjustment.

The captured video may include a plurality of images. After an image is captured by the camera, the image may be analyzed, such as via pattern detection and recognition techniques, to attempt to detect the visual pattern within the image. In some examples, if the visual pattern is detected within the image, then the visual pattern may be replaced with a virtual asset that is inserted into the image at the location of the detected visual pattern. The term virtual asset, as used herein, refers to one or more virtual objects (and/or one or more portions of one or more virtual objects) that are capable of being rendered in an image, for example in a two-dimensional or three-dimensional format. In some cases, the virtual asset may correspond to secondary content, such as advertising. In some examples, the virtual asset may be a two-dimensional asset, such as a virtual poster that advertises a given product. In some other examples, the virtual asset may be a three-dimensional asset, such as a three-dimensional representation of a product that is being advertised, for example a three-dimensional bottle-shaped asset corresponding to a bottle of a beverage that is being advertised.

In some examples, an occlusion determination may be performed for the visual pattern, and the virtual asset may be inserted into the image at the location of the virtual asset based at least in part on the occlusion determination. For example, in some cases, the visual pattern may be occluded by one or more objects that interfere with the camera's view of the visual pattern, such as because those objects are positioned in front of the visual pattern. In these scenarios, it may be desirable for corresponding portions of the virtual asset (that would otherwise be positioned at the occluded locations) to not be inserted into the image. For example, in some cases, when a body part of a person (e.g., hand, arm, face, etc.) temporarily moves between the camera and the virtual asset, the body part may temporarily occlude a portion of the virtual asset. In these scenarios, if the entire virtual asset were inserted into the image, the person's body part may appear to be temporarily chopped-off, which may seem unnatural to viewers. Thus, it may be desirable for corresponding portions of the virtual asset (that would otherwise be positioned at the locations occluded by the person's body part) to not be inserted into the image. This may prevent the occluding body part from appearing to be temporarily chopped-off.

The visual pattern may be used to adjust the color of the inserted virtual asset, such as to more closely correspond to the coloration of the image. This color adjustment may assist in causing the inserted virtual asset to appear as if it were actually physically located within the captured scene. In one specific example, color adjustment for a black and white visual pattern may be performed by determining a maximum pixel color value and a minimum pixel color value for the region of the visual pattern within the image. Additionally, a maximum pixel color value and a minimum pixel color value may be determined for the original virtual asset that is to be inserted into the image. As described in detail below, these values may be used to determine an adjusted pixel color value for each pixel in the virtual asset. While the above-described techniques provide an example color adjustment process for a black and white visual pattern, other techniques may also be employed.

Additionally, in some examples, in addition, or as an alternative, to black and white, a visual pattern may include other colors (e.g., yellow, red, blue, etc.). These other colors may be used to adjust the color of the inserted virtual asset. For example, yellow colors in the virtual asset may be adjusted based on how yellow colors within the visual pattern appear in the image. For example, a difference in color (e.g., difference in pixel color value) may be calculated between a yellow color in a portion of the physical visual pattern and the corresponding representation of the that color in the corresponding portion of the visual pattern as it appears in the image. In some examples, portions of the virtual asset that have a yellow color may then be adjusted based on the calculated color difference, such as to match the change of the yellow-colored portion of the visual pattern in the image.

Furthermore, in some examples, a color in the virtual asset may be adjusted based on differences associated with a plurality of colors in the visual pattern. For example, orange may be formed based on a linear combination of red and yellow. Thus, in some examples, a visual pattern may include red sections and yellow sections, and these red and yellow sections of the visual pattern may be used to adjust orange colors within the virtual asset. For example, differences between a red color in the physical visual pattern and the visual pattern's appearance in the image may be calculated to form a resulting red color adjustment. Additionally, differences between a yellow color in the physical visual pattern and the visual pattern's appearance in the image may be calculated to form a resulting yellow color adjustment. A resulting orange color adjustment for the virtual asset may then be determined based on a linear combination of the resulting red color adjustment and the resulting yellow color adjustment.

Moreover, in some examples, a blurriness adjustment may be performed on the virtual asset based on an appearance of the visual pattern within the image. For example, blurriness may be introduced into the virtual asset in order to match the amount of blurriness of the visual pattern within the image. This blurriness adjustment may assist in causing the inserted virtual asset to appear as if it were actually physically located within the captured scene. In some examples, a blurriness measure for the visual pattern may be calculated, such as by examining edges, lines and/or color borders within the visual pattern, such as an edge of a colored square within a checkerboard pattern. The calculated amount of blurriness may then be applied to features (e.g., lines, edges, etc.) of the virtual asset.

The techniques described herein may allow virtual asset insertion to be performed in a fast, reliable, and cost-effective manner. In particular, in some examples, the techniques described herein may allow for real-time virtual asset insertion. This may be particularly advantageous for live streaming scenarios, such as in which video is captured, delivered and viewed with minimal latency. In some specific examples, this may be particularly beneficial for video of live events, such as live video games and other live sporting events, live news or entertainment events, and many others.

Figure 2:
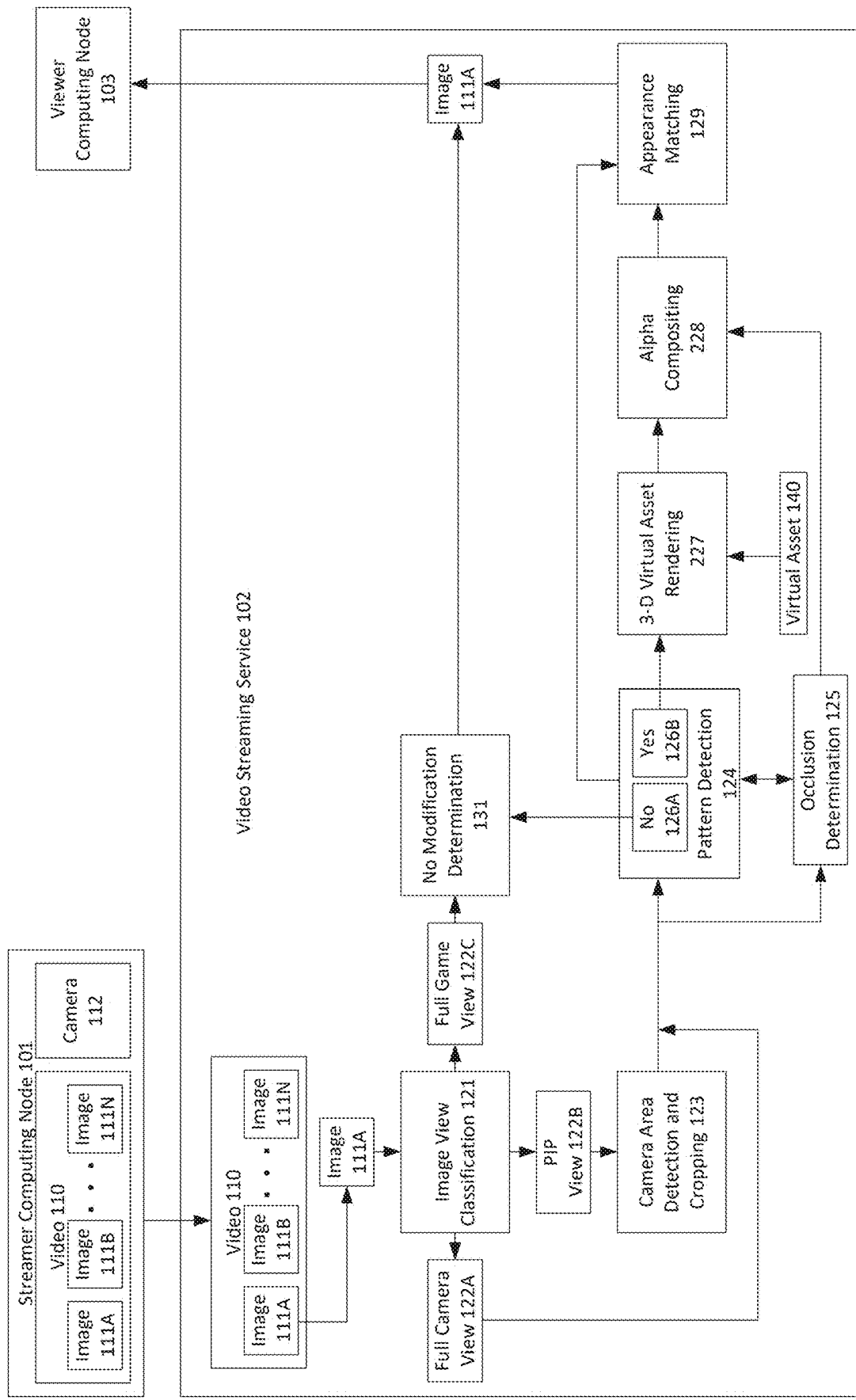
FIG. 2 is a diagram illustrating an example three-dimensional virtual asset insertion system that may be used in accordance with the present description.

FIG. 1 is a diagram illustrating an example two-dimensional virtual asset insertion system that may be used in accordance with the present description. FIGS. 1 and 2 relate to example scenarios in which video 110 is captured at a streamer computing node 101, transmitted to a video streaming service 102 at which asset insertion processing is performed, and then delivered to viewer computing node 103 for viewing. It is noted, however, that there is no requirement that video must be captured, processed, and viewed at separate nodes or devices. In some examples, these operations may be performed at a single node or device or distributed across any number of nodes or devices. Also, in some examples, video 110 may be live streaming video. However, there is no requirement that video 110 must be live streaming video.

FIG. 1 depicts an example system that may be used for insertion of a virtual asset 140 that is two-dimensional, such as a poster or sign. An example system for insertion of a virtual asset 140 that is three-dimensional is described later with reference to FIG. 2. In the example of FIG. 1, video 110 is captured by a camera 112 (which is a physical camera) at streamer computing node 101. A streamer, as that term is used herein, refers to an individual that produces streaming video content. The streamer may send the video 100 to the video streaming service 102, which, in turn, may transmit the video 110 to the streamer's viewers. In one specific example, a streamer may be a video game player that captures game video of himself of herself playing a video game in combination with webcam video of the streamer that includes the streamer's commentary on the game being played. Video 110 may include any number of images 111A-N. Video 110 may be transmitted from streamer computing node 101 to video streaming service 102 over one or more networks, such as including the Internet.

Video 110 may be received by video streaming service 102. The video streaming service may process images 111A-N within video 110. The description below relates to example processing operations for image 111A. However, it is noted that any, or all, of these operations may be performed repeatedly for each image 111A-N within video 110. As shown in FIG. 1, video streaming service may perform an image view classification 121 for image 111A. Specifically, image view classification 121 may determine whether image 111A includes a full camera view 122A, a picture-in-picture (PIP) view 122B or a full game view 122C. A full camera view 122A is an image that includes only image data captured by a physical camera (e.g., camera 112). A PIP view 122B is an image that includes both image data captured by a physical camera and other image data (e.g., image data corresponding to the displayed output of a video game). For example, PIP view 122B may correspond to a scenario in which a video game player captures game video of himself of herself playing a video game in combination with webcam video of the streamer. A full game view 122C is an image that includes only image data corresponding to the displayed output of a video game. As should be appreciated, in some examples, image view classification 121 may be performed in scenarios in which the video streaming service 120 is uncertain of the classification of the images 111A-N in the video 110. For scenarios in which it already known that the video 110 includes a full camera view 122A, a picture-in-picture (PIP) view 122B, a full game view 122C or some other type of view, the image view classification 121 may not be performed.

For scenarios in which image 111A includes a full game view 122C, a no modification determination 131 may be made. This is because, in these scenarios, there is no physical camera data image data in the full game view 122C. For scenarios in which image 111A includes a PIP view 122B, camera area detecting and cropping 123 may be performed to detect the area of the image 111A that includes physical camera image data and to crop this area of the image 111A for further virtual asset insertion processing. For scenarios in which the image 111A includes a full camera view 122A, the camera area detecting and cropping 123 may be skipped. This is because, in these scenarios, there is only physical camera image data in the image 111A.

As shown in FIG. 1, pattern detection 124 may be performed to attempt to detect the visual pattern within the image 111A. Pattern detection 124 may be performed using any of a variety of known computer-based image object detection and recognition techniques. In some examples, pattern detection 124 may be performed by searching the image for corners of the visual pattern or other easily detectable visual features of the visual pattern. If the visual pattern is not detected within the image 111A (corresponding to no box 126A in FIG. 1), then a no modification determination 131 may be made because there is no indication to insert a virtual asset 140 into the image 111A. By contrast, if the visual pattern is detected within the image 111A (corresponding to yes box 126B in FIG. 1), then the virtual asset insertion processing may continue.

An occlusion determination 125 may be performed on the visual pattern 140 to determine which, if any, portions of the visual pattern are occluded in the image 111A. For example, in some cases, the visual pattern may be occluded by one or more objects that interfere with the camera's view of the visual pattern, such as because those objects are positioned in front of the visual pattern. In these scenarios, it may be desirable for corresponding portions of the virtual asset 140 (that would otherwise be positioned at the occluded locations) to not be inserted into the image 111A. For example, in some cases, when a body part of a person (e.g., hand, arm, face, etc.) temporarily moves between the camera and the visual pattern, the body part may temporarily occlude a portion of the visual pattern. In these scenarios, if the virtual asset 140 were inserted in its entirety into the image 111A, the person's body part may appear to be temporarily chopped-off, which may seem unnatural to viewers. Thus, it may be desirable for corresponding portions of the virtual asset 140 (that would otherwise be positioned at the locations occluded by the person's body part) to not be inserted into the image 111A. This may prevent the occluding body part from appearing to be temporarily chopped-off.

In some examples, the occlusion determination 125 may be performed by searching an area of the image at the location of the detected visual pattern and detecting portions of that area whose appearance is inconsistent with corresponding portions of the visual pattern. In one specific example, occlusion determination 125 may be performed by first attempting to detect corners of the visual pattern in the image 111A. For example, in some cases, when attempting to detect corners of the visual pattern in the image 111A, one or more corners of the visual pattern may be detected, while one or more other corners of the visual pattern may not be detected. In this scenario, the non-detected corner(s) of the visual pattern may be determined to be occluded. Neighboring areas of the image may then be examined to determine whether corresponding portions of the visual pattern are detectable in those areas, and, if not, then those corresponding portions of the visual pattern may also be determined to be occluded. The process may then be repeated by examining further neighboring portions of the virtual image.

A geometric adjustment 127 may be performed on the virtual asset 140 based at least in part on characteristics (e.g., size, shape, etc.) of the detected visual pattern in the image 111A. For example, the size and shape of the virtual asset 140 may be adjusted to match the size and shape of the visual pattern in the image 111A. In some cases, certain portions of the virtual asset 140 may be increased or decreased in size relative to one another. For example, in some cases, a left side of the visual pattern may be closer to the camera then a right side of the visual pattern. In this scenario, even though the lengths of the left and right sides of the physical visual pattern may have the same length, the left side of the visual pattern in the image 111A may appear be longer than the right side of the visual pattern in the image 111A. Thus, in this scenario, the length of the left side of the virtual asset may be increased relative to the length of the right side of the virtual asset in order to match the shape of the visual pattern within the image 111A.

During asset positioning 128, the virtual asset 140, which has been geometrically adjusted, may be inserted into the image 111A at the location of the detected visual pattern. As shown in FIG. 1, asset positioning 128 may be performed based, at least in part, on the occlusion determination 125. For example, portions of the virtual asset 140 that correspond to non-occluded portions of the visual pattern may be inserted into the image 111A. By contrast, portions of the virtual asset 140 that correspond to occluded portions of the visual pattern may not be inserted into the image 111A. As described above, in one specific example, a body part of a person (e.g., hand, arm, face, etc.) may temporarily move between the camera and the virtual asset, and the body part may temporarily occlude a portion of the virtual asset 140. Performing the asset positioning 128 based on the occlusion determination 125 may prevent the occluding body part from appearing to be temporarily chopped-off.

Appearance matching 129 may be performed to cause an appearance of the virtual asset 140 to match the appearance of other objects in the image 111A, thereby making it appear as if the virtual asset 140 was actually physically included in the scene captured in image 111A by camera 112. In some examples, appearance matching 129 may include color adjustment and blurriness adjustment of the virtual asset 140. Specifically, the visual pattern may be used to adjust the color of the virtual asset 140, such as to more closely correspond to the coloration of the image 111A. In one specific example, color adjustment for a black and white visual pattern may be performed by determining a maximum pixel color value (w') and a minimum pixel color value (b')

for the region of the visual pattern within the image 111A. Additionally, an original maximum pixel color value (p_w) and an original minimum pixel color value (p_b) may be determined for the virtual asset 140 that is to be inserted into the image 111A. These values may then be used to determine a maximum pixel color value (p_w') and a minimum pixel color value (p_b') for the virtual asset 140 after applying color adjustment based on the following first equation (E1) and second equation (E2):

$$(w'-b')/255=(p\_w'-p\_b')/(p\_w-p\_b) \quad \text{E1}$$

$$(255-w')/b'=(p\_w-p\_w')/(p\_b'-p\_b) \quad \text{E2}$$

Additionally, the original maximum and minimum pixel color values of the virtual asset 140 (p_w and p_b) and the maximum and minimum pixel color values of the virtual asset 140 after color adjustment (p_w' and p_b') may be used to determine an adjusted pixel color value for each pixel in the virtual asset 140 based on the following third equation (E3):

$$(p-p\_b)*(p\_w'-p\_b')/(p\_w-p\_b)+p\_b' \quad \text{E3}$$

While the above-described techniques provide an example color adjustment process for a black and white visual pattern, other techniques may also be employed.

Additionally, in some examples, in addition, or as an alternative, to black and white, a visual pattern may include other colors (e.g., yellow, red, blue, etc.). These other colors may be used to adjust the color of the virtual asset 140. For example, yellow colors in the virtual asset 140 may be adjusted based on how yellow colors within the visual pattern appear in the image 111A. For example, a difference in color (e.g., difference in pixel color value) may be calculated between a yellow color in a portion of the physical visual pattern and the corresponding representation of the that color in the corresponding portion of the visual pattern as it appears in the image 111A. In some examples, portions of the virtual asset 140 that have a yellow color may then be adjusted based on the calculated color difference, such as to match the change of the yellow-colored portion of the visual pattern in the image 111A.

Furthermore, in some examples, a color in the virtual asset 140 may be adjusted based on differences associated with a plurality of colors in the visual pattern. For example, orange may be formed based on a linear combination of red and yellow. Thus, in some examples, a visual pattern may include red sections and yellow sections, and these red and yellow sections of the visual pattern may be used to adjust orange colors within the virtual asset 140. For example, differences between a red color in the physical visual pattern and the visual pattern's appearance in the image 111A may be calculated to form a resulting red color adjustment. Additionally, differences between a yellow color in the physical visual pattern and the visual pattern's appearance in the image may be calculated to form a resulting yellow color adjustment. A resulting orange color adjustment for the virtual asset 140 may then be determined based on a linear combination of the resulting red color adjustment and the resulting yellow color adjustment.

Moreover, in some examples, a blurriness adjustment may be performed on the virtual asset 140 based on an appearance of the visual pattern within the image 111A. For example, blurriness may be introduced into the virtual asset 140 in order to match the amount of blurriness of the visual pattern within the image 111A. This blurriness adjustment may assist in causing the virtual asset 140 to appear as if it were actually physically located within the captured scene.

In some examples, a blurriness measure for the visual pattern may be calculated, such as by examining edges, lines and/or color borders within the visual pattern, such as an edge of a colored square within a checkerboard pattern. The calculated amount of blurriness may then be applied to features (e.g., lines, edges, etc.) of the virtual asset 140.

In some examples, appearance matching 129 may also include adjusting an appearance of the virtual asset 140 to match other appearance characteristics of the visual pattern within the image 111A, such as lighting characteristics, shadow characteristics, and others. For example, in some cases, shadows may be detected on the visual pattern within the image 111A, such as by detecting pixel regions within the visual pattern in the image 111A that are darker than the colors of the corresponding regions of the original visual pattern. In some examples, to detect a shadow, a region may be determined to have colors that are substantially darker than the colors of the corresponding region of the original visual pattern, for example such that the increased darkness is inconsistent with color differences in other areas of the image. For example, in some cases, if a black color (e.g., pixel values at, or close to, zero) is detected in a region of the visual pattern that is not expected to be black (e.g., a white square within in a checkerboard) than this may be indicative of a shadow in that region. When a shadow is detected in a given region of the visual pattern, the appearance of the virtual asset may be adjusted based on the shadow, such as by darkening the appearance of a corresponding region of the virtual asset 140.

Also, in some examples, the appearance of the virtual asset 140 may be adjusted to match lighting characteristics related to the visual pattern in the image 111A. For example, some regions of the visual pattern in image 111A may have greater exposure to light emitted by light sources than do other regions of the visual pattern. For regions of the visual pattern with greater exposure to light, these regions may have colors that are brighter (or less dark) than other areas of the visual pattern in comparison to corresponding regions of the original visual pattern. These color differences with respect to the original visual pattern may also be detected and used to adjust the virtual asset 140. For example, portions of the virtual asset 140 that correspond to regions of the visual pattern with greater exposure to light may be brightened, while portions of the virtual asset 140 that correspond to regions of the visual pattern with greater exposure to light may not be brightened or may be made to appear dimmer.

In the example of FIG. 1, after performance of appearance matching 129, the virtual asset insertion processing may be complete, and the image 111A may be transmitted from the video streaming service 102 to the viewer computing node 103 for viewing.

FIG. 1 depicts an example system that may be used for insertion of a virtual asset 140 that is two-dimensional, such as a poster or sign. However, in some other examples, the virtual asset 140 may be three-dimensional. To assist in insertion of a virtual asset 140 that is three-dimensional, a camera calibration process may be performed to determine information associated with the camera 112, such as its focal length and distortion parameters. In some examples, the camera calibration process may include capturing a video of at least ten seconds in which the visual pattern is displayed to the camera 112 from different perspectives, such as by moving the visual pattern within a field of view of the camera 112. For example, as described above, the visual pattern may be printed on a poster that may be attached to a background area (e.g., a wall of a room). In some examples, before attaching the visual pattern poster to the wall, the streamer may enable performance of the camera calibration process by showing the visual pattern poster to the camera 112 from different perspectives.

FIG. 2 depicts an example system that may be used for insertion of a virtual asset 140 that is three-dimensional, such as a three-dimensional representation of a product that is being advertised, for example a three-dimensional bottle-shaped asset corresponding to a bottle of a beverage that is being advertised. The system of FIG. 2 is identical to the system of FIG. 1, with the exception that geometric adjustment 127 and asset positioning 128 of FIG. 1 are replaced with three-dimensional (3-D) virtual asset rendering 227 and alpha compositing 228 of FIG. 2. Other features of FIG. 2 may operate similarly to those in FIG. 1, and their descriptions are not repeated here.

In some examples, 3-D virtual asset rendering 227 may be performed based, at least in part, on the camera calibration process described above. During 3-D virtual asset rendering 227, virtual asset 140 is rendered in a three-dimensional form based on the positional relationship between the camera 112 and the detected visual pattern in the image 111A. For example, when the virtual asset 140 is three-dimensional, certain portions of the virtual asset 140 may, or may not, be visible depending upon the positional relationship between the camera 112 and the detected visual pattern in the image 111A. As a specific example, in some cases, the camera 112 may be to the left of the visual pattern, meaning that the camera may be closer to a left side of the visual pattern than to a right side of the visual pattern. In this scenario, when the virtual asset 140 is three-dimensional, some (or all) portions of the right side of the virtual asset 140 may not be visible when the virtual asset is rendered in the image 111A (e.g., because they may be obstructed by other portions of the virtual asset 140). As another specific example, in some cases, the camera 112 may be to the right of the visual pattern, meaning that the camera may be closer to a right side of the visual pattern than to a left side of the visual pattern. In this scenario, when the virtual asset 140 is three-dimensional, some (or all) portions of the left side of the virtual asset 140 may not be visible when the virtual asset is rendered in the image 111A (e.g., because they may be obstructed by other portions of the virtual asset 140).

During alpha compositing 228, the virtual asset 140 (as rendered based on the output of 3-D virtual asset rendering 227) is inserted into the image 111A, while also taking a transparency and/or translucency of the virtual asset 140 (and/or portions thereof) into consideration. For example, certain portions of the virtual asset 140 may be transparent and/or translucent. One example of this may be a virtual asset 140 that corresponds to a three-dimensional bottle that is translucent, such as to simulate clear glass or plastic. In this example scenario, the three-dimensional bottle may be rendered and displayed translucently in the image 111A. Additionally, behind the translucent bottle, the background of the scene may also be rendered such that it is partially visible behind the translucent bottle. For example, if the background of the scene is a green wall, the image 111A may be modified such that the green wall appears to be visible behind the translucent bottle. It is further noted that alpha compositing 228 may be performed based on occlusion determination 125, such as in the same, or similar, manner as described above with regard to asset positioning 128 of FIG. 1. For example, portions of the virtual asset 140 that correspond to non-occluded portions of the visual pattern may be inserted into the image 111A. By contrast, portions of the virtual asset 140 that correspond to occluded portions of the visual pattern may not be inserted into the image 111A.

Figure 3:
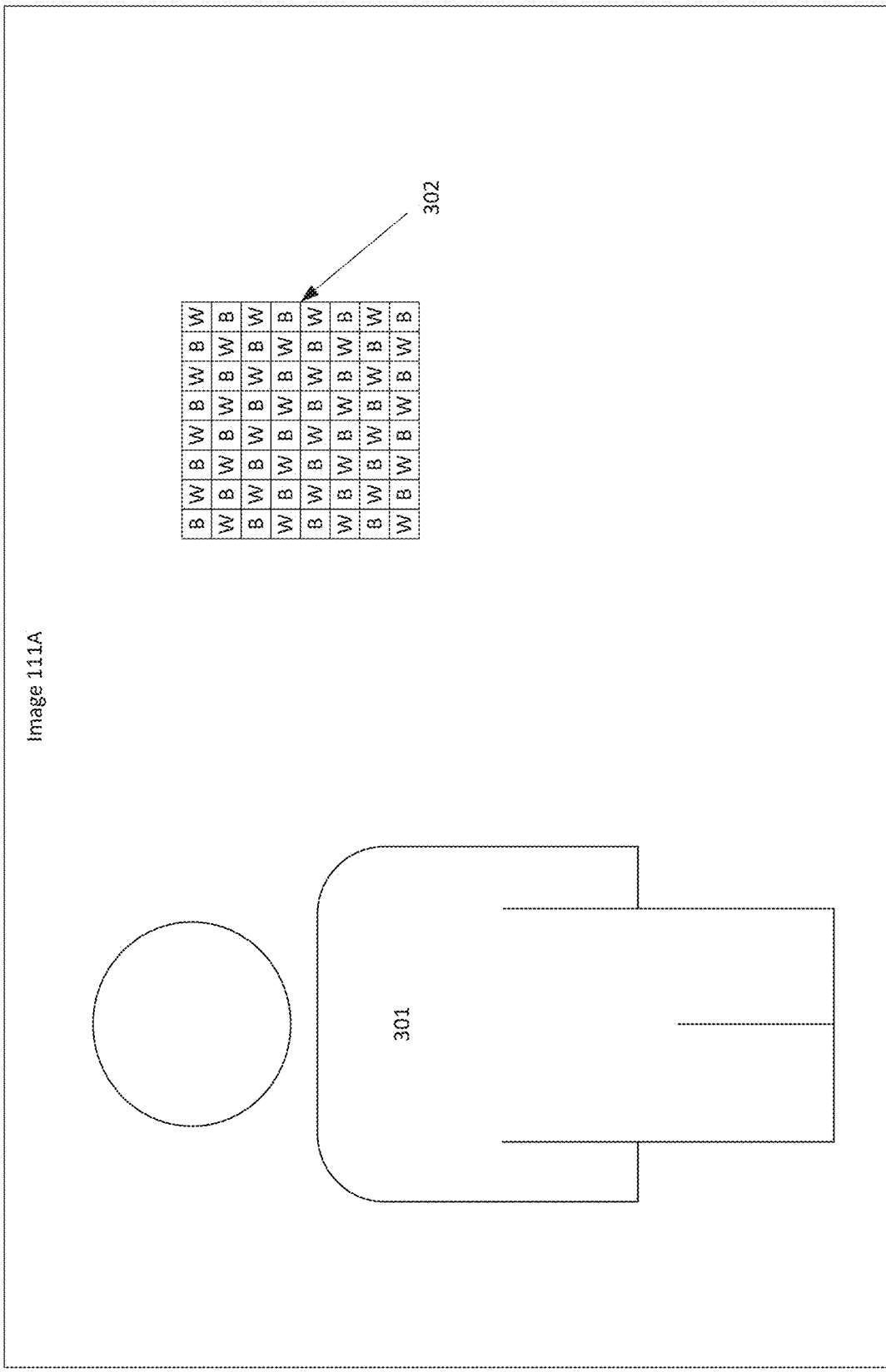
FIG. 3 is a diagram illustrating an example image with a non-occluded visual pattern that may be used in accordance with the present description.
Figure 4:
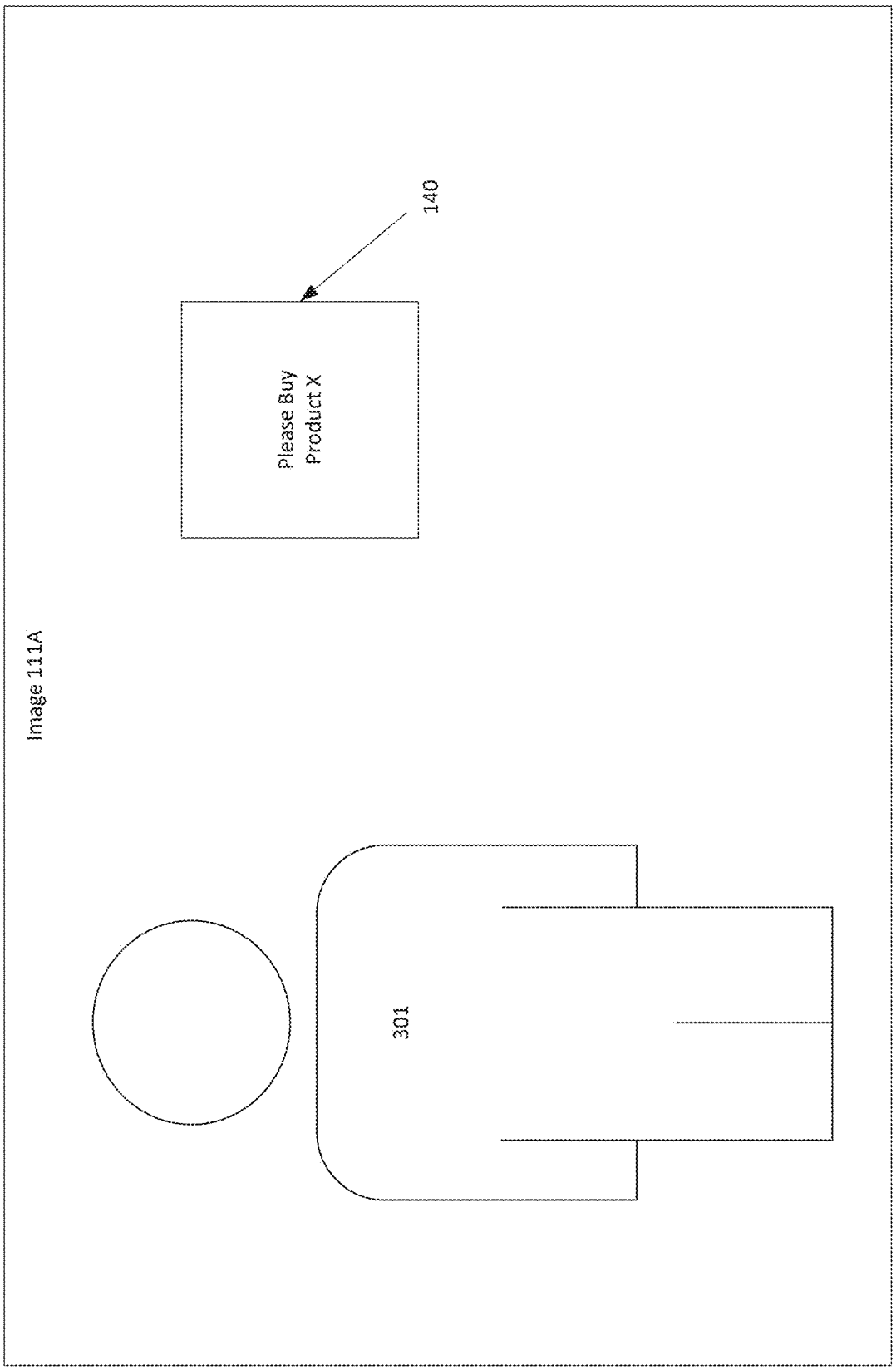
FIG. 4 is a diagram illustrating an example image with a virtual asset inserted based on a non-occluded visual pattern that may be used in accordance with the present description.

Referring now to FIG. 3, an example of image 111A with a non-occluded visual pattern will be described. Specifically, as shown in FIG. 3, image 111A includes visual pattern 302, which is not occluded in the example of FIG. 3. In this example, visual pattern 302 is a checkerboard that includes a combination of black squares (indicated by squares labeled with the letter B) and white squares (indicated by squares labeled with the letter W). As described above, many other types of visual patterns may also be used. A person 301, such as a streamer, is also included in the image 111A. Referring now to FIG. 4, it is shown that virtual asset 140 is inserted into image 111A at the location of visual pattern 302. In this example, the virtual asset 140 is a two-dimensional poster that includes an advertisement displaying the words, "Please Buy Product X." It is noted that this is merely an example of virtual asset 140 and that many other types of assets (including three-dimensional assets) may alternatively be used. In this example, because the visual pattern 302 is not occluded in FIG. 3, all portions of the virtual asset 140 are displayed in FIG. 4.

Figure 5:
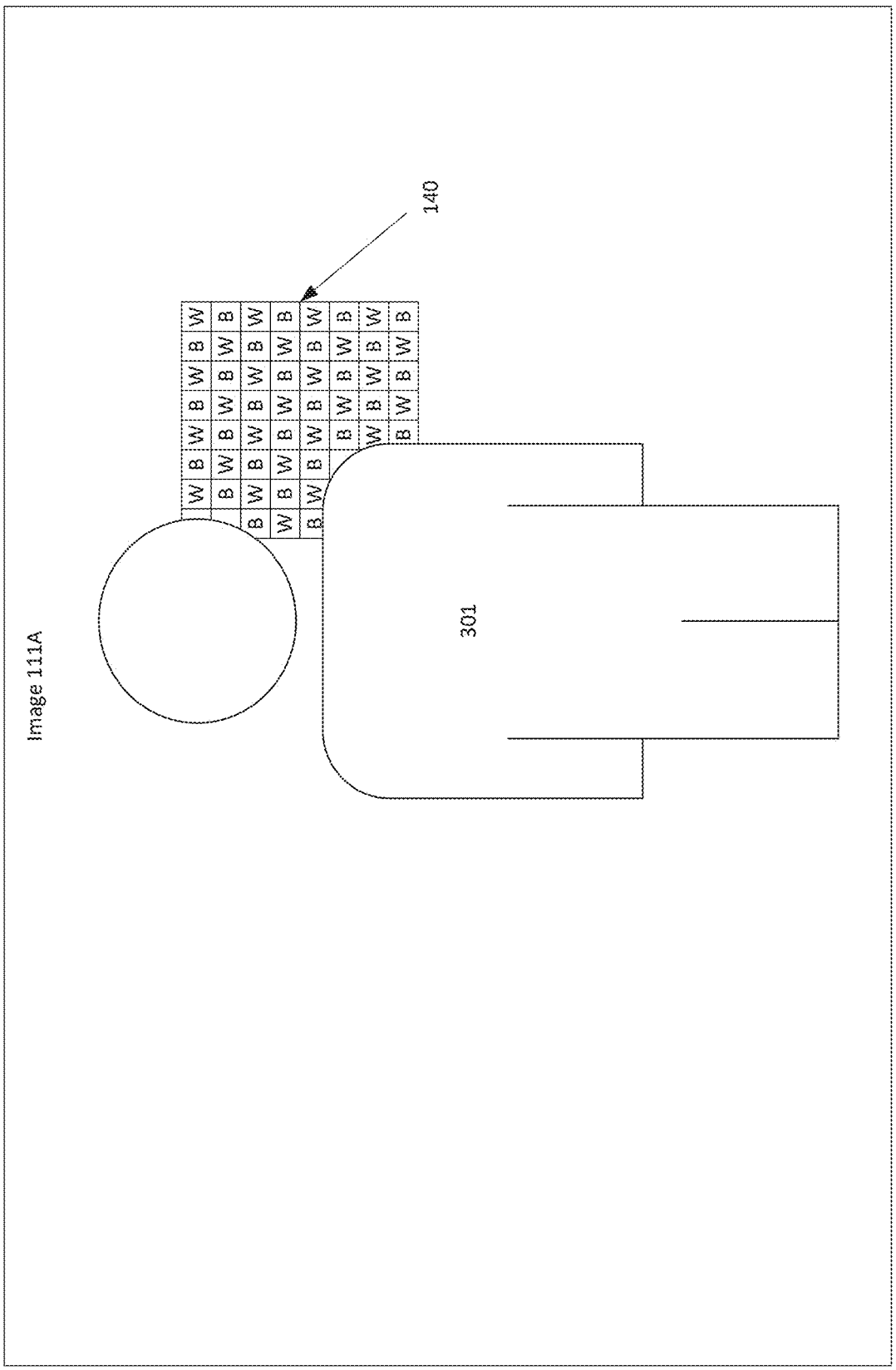
FIG. 5 is a diagram illustrating an example image with a partially occluded visual pattern that may be used in accordance with the present description.
Figure 6:
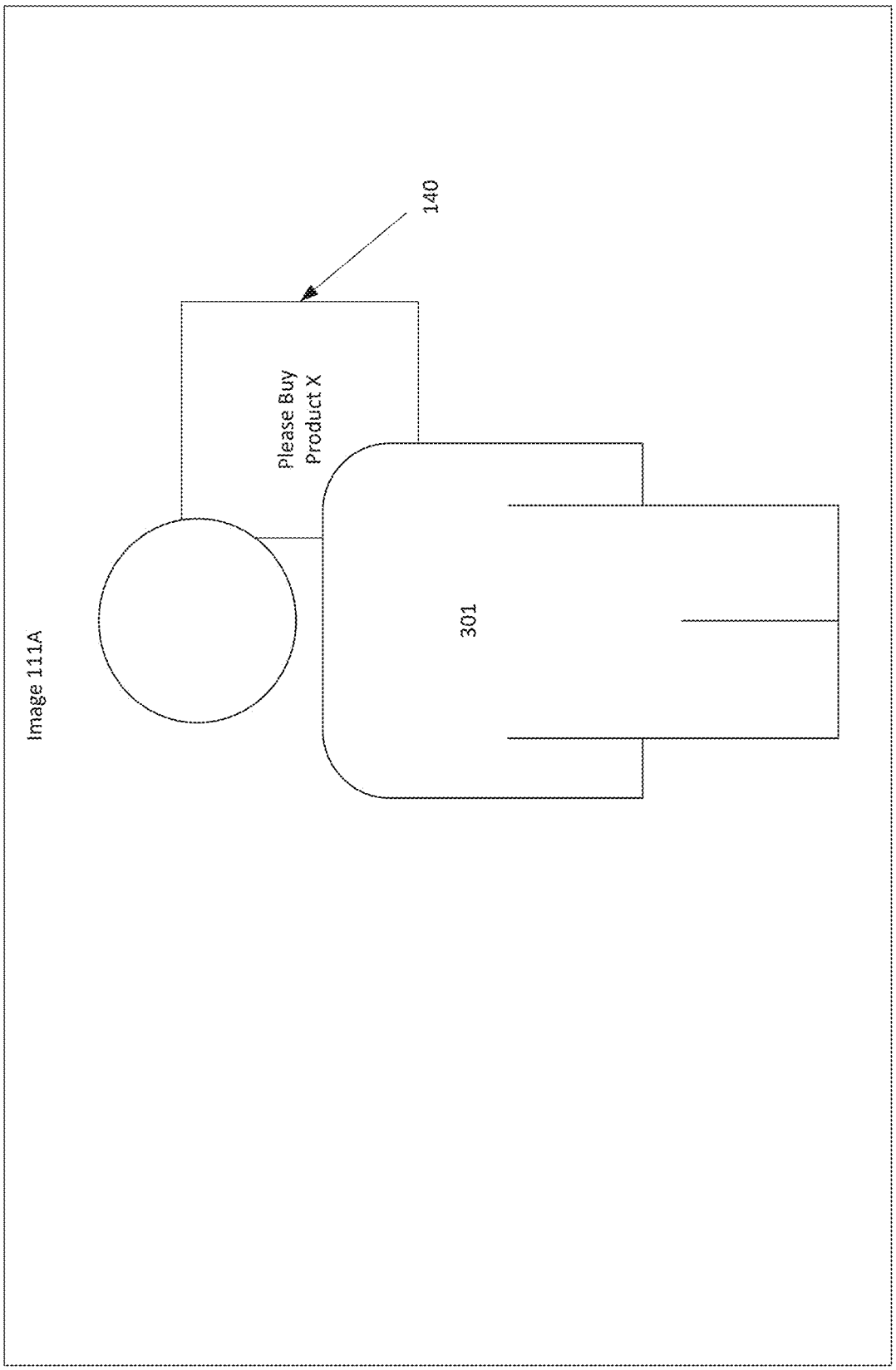
FIG. 6 is a diagram illustrating an example image with a virtual asset inserted based on a partially occluded visual pattern that may be used in accordance with the present description.

Referring now to FIG. 5, an example of image 111A with a partially occluded visual pattern will be described. Specifically, as shown in FIG. 5, image 111A includes visual pattern 302, which is partially occluded in the example of FIG. 5. Specifically, in FIG. 5, corners of the visual pattern 302 are occluded by the head and the shoulders of person 301. Referring now to FIG. 6, it is shown that virtual asset 140 is inserted into image 111A at the location of visual pattern 302. In this example, portions of virtual asset 140 that positionally correspond to the occluded portions of visual pattern 302 are not displayed in image 111A. Specifically, in FIG. 6, corners of the virtual asset 140 that would otherwise be displayed over parts of the head and shoulder of person 301 are not inserted into image 111A. This prevents the virtual asset 140 from covering parts of the head and shoulder of person 301, thereby avoiding the appearance that parts of the head and shoulder of person 301 have been chopped-off.

Figure 7:
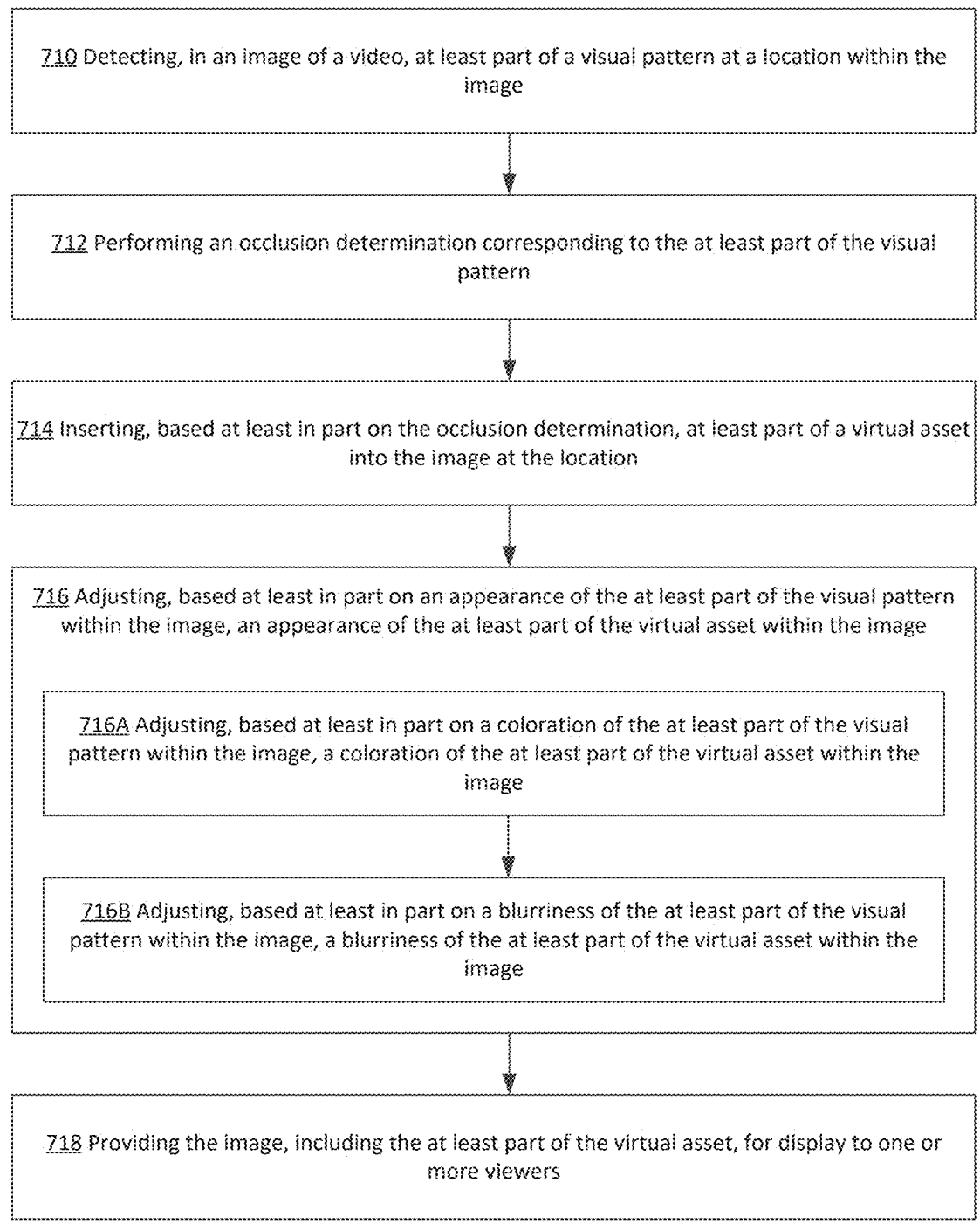
FIG. 7 is a flowchart illustrating an example virtual asset insertion process that may be used in accordance with the present description.

FIG. 7 is a flowchart illustrating an example virtual asset insertion process that may be used in accordance with the present description. In some examples, any, or all, of the operations of FIG. 7 may be performed in real-time, such as in association with delivery of live streaming video. At operation 710, at least part of a visual pattern is detected, in an image of a video, at a location within the image. The at least part of the visual pattern may be displayed in a scene captured by a camera when generating the image. The visual pattern may be a visual pattern that is easily detectable within images of the video. Additionally, the visual pattern may be a pattern whose boundaries (e.g., corners, edges) may be reliably detected with high accuracy within images of the video. The at least part of the visual pattern may be a visual queue to insert least part of a virtual asset into the image at the location at which the at least part of the visual pattern is detected. In some examples, the visual pattern may be a checkerboard pattern. Also, in some examples, the visual pattern may include at least two colors, such as black and white (e.g., a checkerboard with black and white squares). Furthermore, in some examples, the visual pattern may include at least one additional color in addition to black and white (e.g., a checkerboard with black, white, yellow, pink, blue, green and/or other colored squares). As an alternative to a checkerboard, other visual patterns may be used, such as matrix tags, April tags, and others. In some examples, detection of the visual pattern may be performed using any of a variety of known computer-based image object detection and recognition techniques. In some examples, pattern detection may be performed by searching the image for corners of the visual pattern or other easily detectable visual features of the visual pattern. As should be appreciated, coordination may be required between the streamer and the service that detects the visual pattern, for example such that the streamer displays to the camera the same visual pattern that the service attempts to detect within the image.

At operation 712, an occlusion determination is performed corresponding to the at least part of the visual pattern. Performance of the occlusion determination may include determining which, if any, portions of the visual pattern are occluded in the image. Thus, in some examples, the occlusion determination performed at operation 712 may be a determination that the visual pattern is fully displayed and is not occluded within the image. In some other examples, the occlusion determination performed at operation 712 may be a determination that one or more portions of the visual pattern are occluded within the image and one or more other portions of the visual pattern are not occluded within the image. For example, in some cases, the visual pattern may be occluded by one or more objects that interfere with the camera's view of the visual pattern, such as because those objects are positioned in front of the visual pattern. In some examples, the occlusion determination may be performed by searching an area of the image at the location of the detected visual pattern and detecting portions of that area whose appearance is inconsistent with corresponding portions of the visual pattern. In one specific example, the occlusion determination be performed by first attempting to detect corners of the visual pattern in the image. For example, in some cases, when attempting to detect corners of the visual pattern in the image, one or more corners of the visual pattern may be detected, while one or more other corners of the visual pattern may not be detected. In this scenario, the non-detected corner(s) of the visual pattern may be determined to be occluded. Neighboring areas of the image may then be examined to determine whether corresponding portions of the visual pattern are detectable in those areas, and, if not, then those corresponding portions of the visual pattern may also be determined to be occluded. The process may then be repeated by examining further neighboring portions of the virtual image.

At operation 714, at least part of a virtual asset is inserted, based at least in part on the occlusion determination, into the image at the location. For example, operation 714 may include inserting the at least part of the virtual asset into one or more areas of the image at which the visual pattern is not occluded. Additionally, the at least part of the virtual asset may not be inserted into one or more other areas of the image at which the visual pattern is occluded. As described above, in some cases, the visual pattern may be occluded by one or more objects that interfere with the camera's view of the visual pattern, such as because those objects are positioned in front of the visual pattern. In these scenarios, it may be desirable for corresponding portions of the virtual asset (that would otherwise be positioned at the occluded locations) to not be inserted into the image. For example, in some cases, when a body part of a person (e.g., hand, arm, face, etc.) temporarily moves between the camera and the visual pattern, the body part may temporarily occlude a portion of the visual pattern. In these scenarios, if the virtual asset were inserted in its entirety into the image, the person's body part may appear to be temporarily chopped-off, which may seem unnatural to viewers. Thus, it may be desirable for corresponding portions of the virtual asset (that would otherwise be positioned at the locations occluded by the person's body part) to not be inserted into the image. This may prevent the occluding body part from appearing to be temporarily chopped-off.

The at least part of the virtual asset may replace the at least part of the visual pattern within the image. In some examples, the virtual asset may be two-dimensional. For a two-dimensional virtual asset, operation 714 may include, or may be performed in association with, geometric adjustment 127 and asset positioning 128 of FIG. 1. As described above, a geometric adjustment 127 may be performed on the virtual asset 140 based at least in part on characteristics (e.g., size, shape, etc.) of the detected visual pattern in the image 111A. For example, the size and shape of the virtual asset 140 may be adjusted to match the size and shape of the visual pattern in the image 111A. In some cases, certain portions of the virtual asset 140 may be increased or decreased in size relative to one another. For example, in some cases, a left side of the visual pattern may be closer to the camera then a right side of the visual pattern. In this scenario, even though the lengths of the left and right sides of the physical visual pattern may have the same length, the left side of the visual pattern in the image 111A may appear be longer than the right side of the visual pattern in the image 111A. Thus, in this scenario, the length of the left side of the virtual asset may be increased relative to the length of the right side of the virtual asset in order to match the shape of the visual pattern within the image 111A. During asset positioning 128, the virtual asset 140, which has been geometrically adjusted, may be inserted into the image 111A at the location of the detected visual pattern. As shown in FIG. 1, asset positioning 128 may be performed based, at least in part, on the occlusion determination 125. For example, portions of the virtual asset 140 that correspond to non-occluded portions of the visual pattern may be inserted into the image 111A. By contrast, portions of the virtual asset 140 that correspond to occluded portions of the visual pattern may not be inserted into the image 111A.

In some examples, the virtual asset may be three-dimensional. For a three-dimensional virtual asset, operation 714 may include, or may be performed in association with, 3-D virtual asset rendering 227 and alpha compositing 228 of FIG. 2. In some examples, 3-D virtual asset rendering 227 may be performed based, at least in part, on a camera calibration process described such as above. During 3-D virtual asset rendering 227, virtual asset 140 is rendered in a three-dimensional form based on the positional relationship between the camera 112 and the detected visual pattern in the image 111A. For example, when the virtual asset 140 is three-dimensional, certain portions of the virtual asset 140 may, or may not, be visible depending upon the positional relationship between the camera 112 and the detected visual pattern in the image 111A. As a specific example, in some cases, the camera 112 may be to the left of the visual pattern, meaning that the camera may be closer to a left side of the visual pattern than to a right side of the visual pattern. In this scenario, when the virtual asset 140 is three-dimensional, some (or all) portions of the right side of the virtual asset 140 may not be visible when the virtual asset is rendered in the image 111A (e.g., because they may be obstructed by other portions of the virtual asset 140). During alpha compositing 228, the virtual asset 140 (as rendered based on the output of 3-D virtual asset rendering 227) is inserted into the image 111A, while also taking a transparency and/or translucency of the virtual asset 140 (and/or portions thereof) into consideration. For example, certain portions of the virtual asset 140 may be transparent and/or translucent. One example of this may be a virtual asset 140 that corresponds to a three-dimensional bottle that is translucent, such as to simulate clear glass or plastic. In this example scenario, the three-dimensional bottle may be rendered and displayed translucently in the image 111A. Additionally, behind the translucent bottle, the background of the scene may also be rendered such that it is partially visible behind the translucent bottle. For example, if the background of the scene is a green wall, the image 111A may be modified such that the green wall appears to be visible behind the translucent bottle. It is further noted that alpha compositing 228 may be performed based on occlusion determination 125, such as in the same, or similar, manner as described above with regard to asset positioning 128 of FIG. 1.

In some examples, at least one of a size or an orientation of the at least part of the virtual asset may be modified in association with the inserting of the at least part of the virtual asset into the image. For example, in some cases, the virtual asset may be scaled such that its size is increased or decreased. In some examples, the virtual asset may be scaled such that it exceeds the size of the visual pattern that is detected within the image. In other examples, the virtual asset may be scaled such that it is less than the size of the visual pattern that is detected within the image. In some examples, the size of the visual pattern may be scaled based on a selected size, size range, maximum size and/or minimum size. For example, the virtual asset may be made to have the same size as the visual pattern within the image unless the visual pattern is less than a selected minimum size. If the visual pattern is less than the selected minimum size, the virtual asset may be set to the selected minimum size. Also, in some examples, an orientation of the virtual asset may be modified. For example, in some cases, the virtual asset may be rotated. In one specific example, the virtual asset may be rotated such that a selected portion of the virtual asset (e.g., a product label, etc.) is always directly facing and/or in view of the camera or is rotated away from a shadow or poor lighting condition.

At operation 716, an appearance of the at least part of the virtual asset within the image is adjusted based at least in part on an appearance of the at least part of the visual pattern within the image. As described above, appearance matching 129 of FIGS. 1 and 2 may be performed to cause an appearance of the virtual asset 140 to match the appearance of other objects in the image 111A, thereby making it appear as if the virtual asset 140 was actually physically included in the scene captured in image 111A by camera 112. In some examples, operation 716 may include sub-operations 716A and 716B. At sub-operation 716A, a coloration of the at least part of the virtual asset within the image is adjusted based at least in part on a coloration of the at least part of the visual pattern within the image. As also described above, the visual pattern may be used to adjust the color of the virtual asset 140, such as to more closely correspond to the coloration of the image 111A. In one specific example, color adjustment for a black and white visual pattern may be performed by determining a maximum pixel color value (w') and a minimum pixel color value (b') for the region of the visual pattern within the image 111A. Additionally, an original maximum pixel color value (p_w) and an original minimum pixel color value (p_b) may be determined for the virtual asset 140 that is to be inserted into the image 111A. As described in detail above, these values may be used to determine an adjusted pixel color value for each pixel in the virtual asset. While the above-described techniques provide an example color adjustment process for a black and white visual pattern, other techniques may also be employed.

Additionally, in some examples, in addition, or as an alternative, to black and white, a visual pattern may include other colors (e.g., yellow, red, blue, etc.). These other colors may be used to adjust the color of the virtual asset 140. For example, yellow colors in the virtual asset 140 may be adjusted based on how yellow colors within the visual pattern appear in the image 111A. For example, a difference in color (e.g., difference in pixel color value) may be calculated between a yellow color in a portion of the physical visual pattern and the corresponding representation of the that color in the corresponding portion of the visual pattern as it appears in the image 111A. In some examples, portions of the virtual asset 140 that have a yellow color may then be adjusted based on the calculated color difference, such as to match the change of the yellow-colored portion of the visual pattern in the image 111A.

Furthermore, in some examples, a color in the virtual asset 140 may be adjusted based on differences associated with a plurality of colors in the visual pattern. For example, orange may be formed based on a linear combination of red and yellow. Thus, in some examples, a visual pattern may include red sections and yellow sections, and these red and yellow sections of the visual pattern may be used to adjust orange colors within the virtual asset 140. For example, differences between a red color in the physical visual pattern and the visual pattern's appearance in the image 111A may be calculated to form a resulting red color adjustment. Additionally, differences between a yellow color in the physical visual pattern and the visual pattern's appearance in the image may be calculated to form a resulting yellow color adjustment. A resulting orange color adjustment for the virtual asset 140 may then be determined based on a linear combination of the resulting red color adjustment and the resulting yellow color adjustment.

At sub-operation 716B, a blurriness of the at least part of the virtual asset within the image is adjusted based at least in part on a blurriness of the at least part of the visual pattern within the image. For example, blurriness may be introduced into the virtual asset 140 in order to match the amount of blurriness of the visual pattern within the image 111A. This blurriness adjustment may assist in causing the virtual asset 140 to appear as if it were actually physically located within the captured scene. In some examples, a blurriness measure for the visual pattern may be calculated, such as by examining edges, lines and/or color borders within the visual pattern, such as an edge of a colored square within a checkerboard pattern. The calculated amount of blurriness may then be applied to features (e.g., lines, edges, etc.) of the virtual asset 140.

In some examples, operation 716 may also include other adjustments to the appearance of the virtual asset. For example, adjusting the appearance of the at least part of the virtual asset within the image may include adjusting, based at least in part on at least one of shadow characteristics or lighting characteristics associated with the at least part of the visual pattern within the image, the appearance of the at least part of the virtual asset within the image. For example, coloration of the at least part of the virtual asset within the image may be adjusted based at least in part on at least one of shadow characteristics or lighting characteristics associated with the at least part of the visual pattern within the image. The use of shadow characteristics and lighting characteristics to adjust the appearance of the virtual asset is described above with respect to appearance matching 129 of FIG. 1, and this description is not repeated here.

At operation 718, the image, including the at least part of the virtual asset, is provided for display to one or more viewers. The providing of the image at operation 718 may include transmitting the image, such as over one or more networks, to a node and/or device that displays the image, for example as part of a played video. For example, as shown in FIGS. 1 and 2, image 111A is transmitted from the video streaming service 102 to viewer computing node 103, at which the image 111A may be displayed to one or more viewers.

Figure 8:
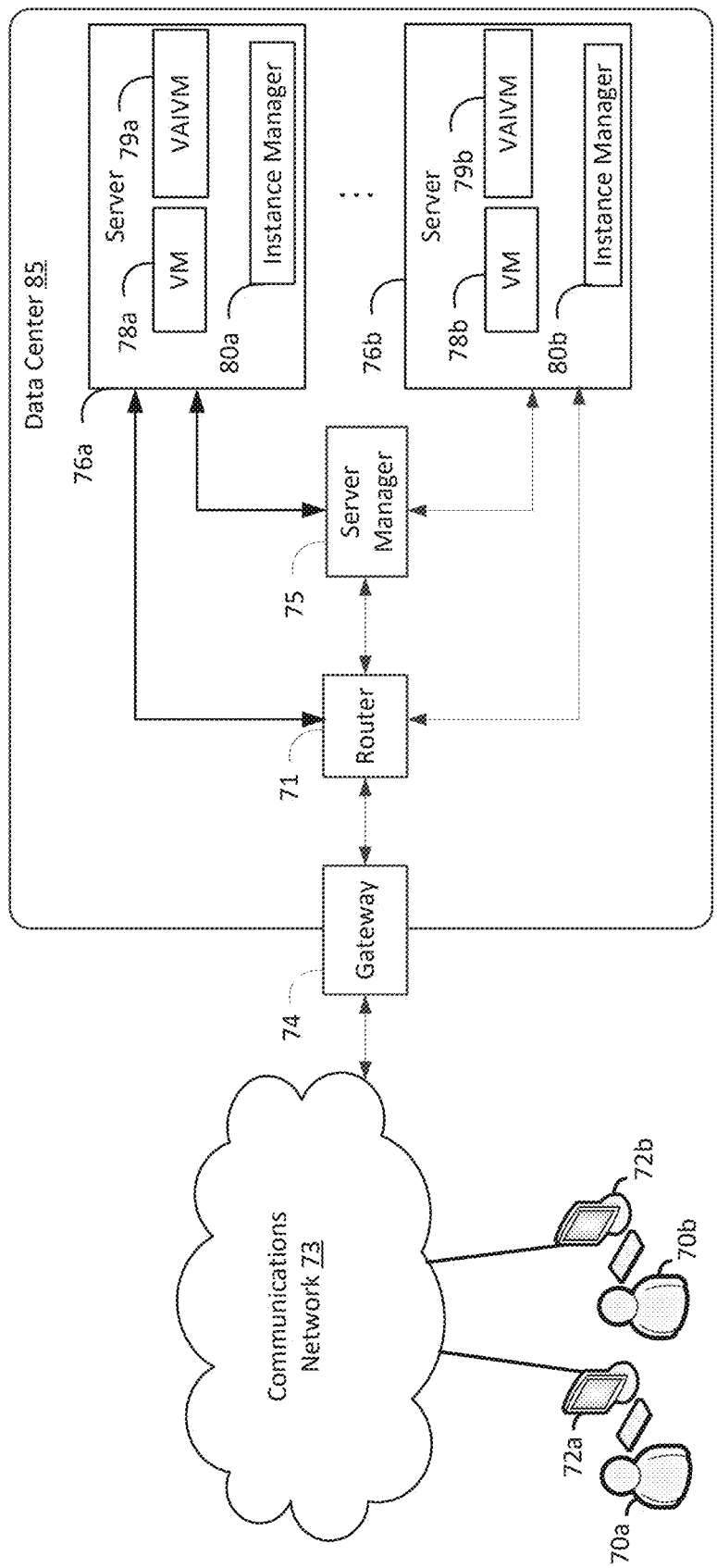
FIG. 8 is a diagram illustrating an example system for transmitting and providing data that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include virtual asset insertion virtual machines (VAIVM's) 79*a-b*, which are virtual machines that are configured to execute any, or all, of the virtual asset insertion techniques and other techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
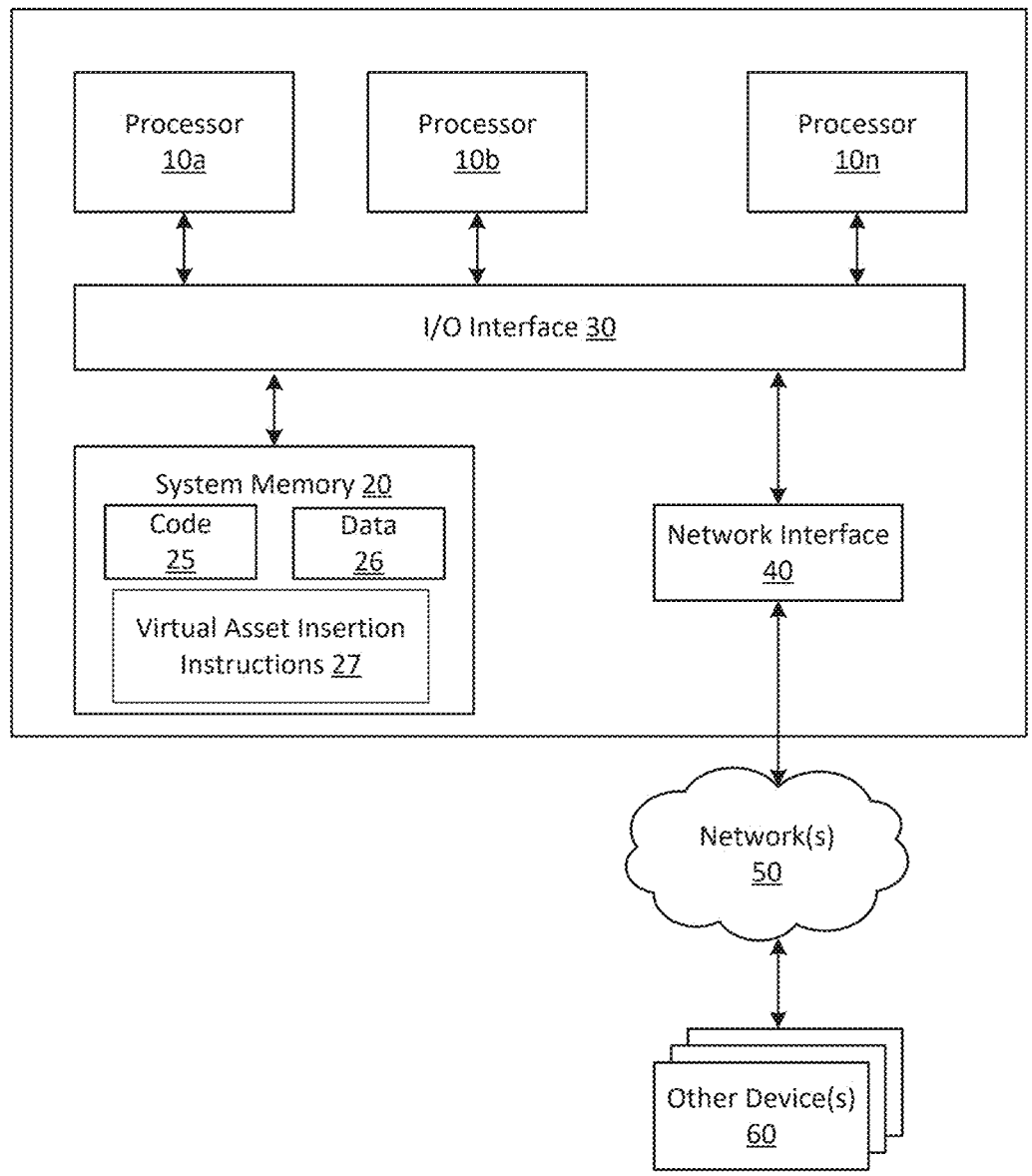
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes virtual asset insertion instructions 27, which are instructions for executing any, or all, of the virtual asset insertion techniques and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:
1. A computing system comprising:
one or more processors; and
one or more memories having stored therein instructions that, upon execution by the one or more processors, cause the computing system to perform computing operations comprising:
detecting, in an image of a video, at least part of a visual pattern at a location within the image, wherein the at least part of the visual pattern is displayed in a scene captured by a camera when generating the image;
determining a difference in color between the at least part of the visual pattern in the image and a corresponding physical representation of the visual pattern inserted into a scene from which the image was captured;

performing a determination that a portion of the visual pattern is occluded in the image;

inserting, based at least in part on the determination, at least part of a virtual asset into the image at the location, wherein the at least part of the virtual asset replaces the at least part of the visual pattern within the image; and adjusting, based at least in part on the difference in color, a coloration of the at least part of the virtual asset within the image.

2. The computing system of claim 1, wherein the visual pattern is a checkerboard pattern.

3. The computing system of claim 1, further comprising adjusting, based at least in part on a blurriness of the at least part of the visual pattern within the image, a blurriness of the at least part of the virtual asset within the image.

4. The computing system of claim 1, wherein the detecting, the determining, the performing, the inserting and the adjusting are performed in real-time in association with delivery of live streaming video.

5. A computer-implemented method comprising:

detecting, in an image of a video, at least part of a visual pattern at a location within the image;

determining a difference in color between the at least part of the visual pattern in the image and a corresponding physical representation of the visual pattern inserted into a scene from which the image was captured;

performing a determination that a portion of the visual pattern is occluded in the image;

inserting, based at least in part on the determination, at least part of a virtual asset into the image at the location; and adjusting, based at least in part on the difference in color a, a coloration of the at least part of the virtual asset within the image.

6. The computer-implemented method of claim 5, wherein the visual pattern is a checkerboard pattern.

7. The computer-implemented method of claim 5, wherein the visual pattern includes at least black and white.

8. The computer-implemented method of claim 7, wherein the visual pattern includes at least one additional color in addition to the black and the white.

9. The computer-implemented method of claim 5, wherein the virtual asset is two-dimensional.

10. The computer-implemented method of claim 5, wherein the virtual asset is three-dimensional.

11. The computer-implemented method of claim 5, further comprising: adjusting, based at least in part on a blurriness of the at least part of the visual pattern within the image, a blurriness of the at least part of the virtual asset within the image.

12. The computer-implemented method of claim 5, further comprising: adjusting, based at least in part on at least one of shadow characteristics or lighting characteristics associated with the at least part of the visual pattern within the image, an appearance of the at least part of the virtual asset within the image.

13. The computer-implemented method of claim 5, wherein the inserting, based at least in part on the determination, the at least part of the virtual asset into the image at the location comprises inserting the at least part of the virtual asset into one or more areas of the image at which the visual pattern is not occluded.

14. The computer-implemented method of claim 5, further comprising modifying at least one of a size or an orientation of the at least part of the virtual asset in association with the inserting of the at least part of a virtual asset into the image.

15. The computer-implemented method of claim 5, wherein the at least part of the visual pattern is displayed in a scene captured by a camera when generating the image.

16. One or more non-transitory computer-readable storage media having stored thereon computing instructions that, upon execution by one or more computing devices, cause the one or more computing devices to perform computing operations comprising:

detecting, in an image of a video, at least part of a visual pattern at a location within the image;

determining a difference in color between the at least part of the visual pattern in the image and a corresponding physical representation of the visual pattern inserted into a scene from which the image was captured;

performing a determination that a portion of the visual pattern is occluded in the image;

inserting, based at least in part on the determination, at least part of a virtual asset into the image at the location; and adjusting, based at least in part on the difference in color, a coloration of the at least part of the virtual asset within the image.

17. The one or more non-transitory computer-readable storage media of claim 16, wherein the visual pattern is a checkerboard pattern.

18. The one or more non-transitory computer-readable storage media of claim 16, wherein the inserting, based at least in part on the determination, the at least part of the virtual asset into the image at the location comprises inserting the at least part of the virtual asset into one or more areas of the image at which the visual pattern is not occluded.

19. The one or more non-transitory computer-readable storage media of claim 18, wherein the at least part of the virtual asset is not inserted into one or more other areas of the image at which the visual pattern is occluded.

* * * * *